United States Patent [19]

Takizawa et al.

[11] Patent Number: 4,833,550
[45] Date of Patent: May 23, 1989

[54] MAGNETIC DISK DEVICE HAVING A MECHANISM FOR REMOVING AN ADHESION BETWEEN A MAGNETIC HEAD AND A MAGNETIC DISK

[75] Inventors: Toshimitsu Takizawa, Tachikawa; Yoshihiro Kawata, Ohme, both of Japan

[73] Assignee: Kabushiki Kaisha Toshiba, Kanagawa, Japan

[21] Appl. No.: 66,542

[22] Filed: Jun. 26, 1987

[30] Foreign Application Priority Data

Jun. 30, 1986 [JP] Japan ................. 61-153250

[51] Int. Cl.[4] ................................ G11B 5/54
[52] U.S. Cl. .................... 360/75; 360/103; 360/105
[58] Field of Search ............. 360/75, 103, 105, 106, 360/97, 78

[56] References Cited

U.S. PATENT DOCUMENTS

| | | | |
|---|---|---|---|
| 4,530,021 | 7/1985 | Cameron | 360/97 |
| 4,542,429 | 9/1985 | Nishida et al. | 360/103 |
| 4,589,036 | 5/1986 | Bertschy et al. | 360/75 |
| 4,636,884 | 1/1987 | Hattori et al. | 360/78 |
| 4,647,997 | 3/1987 | Westwood | 360/105 |
| 4,654,735 | 3/1987 | Izraelev et al. | 360/105 |
| 4,686,595 | 8/1987 | Bryer | 360/106 |
| 4,706,142 | 11/1987 | Hattori et al. | 360/105 |
| 4,716,480 | 12/1987 | Wiens et al. | 360/105 |
| 4,725,907 | 2/1988 | Jue | 360/105 |

FOREIGN PATENT DOCUMENTS

| | | | |
|---|---|---|---|
| 57-103161 | 6/1982 | Japan | 360/75 |
| 58-1858 | 1/1983 | Japan | 360/75 |
| 2166279 | 4/1986 | United Kingdom | 360/103 |

OTHER PUBLICATIONS

Official Gazette, SHO 61-61191, N.E.C., Suenaga, 12/86.

Primary Examiner—Alan Faber
Assistant Examiner—Steven R. Garland
Attorney, Agent, or Firm—Finnegan, Henderson, Farabow, Garrett & Dunner

[57] ABSTRACT

A magnetic disk device of the present invention is configured so that a stopper for controlling the movement of a carriage arm is adapted to give rise to play in controlling the carriage arm when the stopper is in the closed state. When a disk rotating means is actuated, the magnetic disk device permits a disk and a magnetic head in the state of fast mutual adhesion to be separated from each other by causing the carriage arm to swing with the stopper kept in the closed state, and consequently, the magnetic disk device enables the disk to rotate without fail.

9 Claims, 3 Drawing Sheets

MAGNETIC DISK DEVICE HAVING A MECHANISM FOR REMOVING AN ADHESION BETWEEN A MAGNETIC HEAD AND A MAGNETIC DISK

The present application claims priority of Japanese patent application No. 61-153250 filed on June 30, 1986.

FIELD OF THE INVENTION AND RELATED ART STATEMENT

This invention relates to a magnetic disk device which uses as a data recording medium, a metallic film disk having a smooth layer of magnetic material formed by spattering or plating.

Of all the data recording media used in conventional magnetic devices, a coating disk having a magnetic powder applied on the surface has assumed the leadership. In recent years, the growing trend in magnetic disk devices toward an increase in recording density has encouraged adoption of a magnetic film disk material formed by spattering or plating.

The magnetic film disk has an average roughness in the range of 0.01 to 0.002 $\mu$m as expressed by the Ra value. Compared with the coating disk whose Ra value falls in the range of 0.07 to 0.04 $\mu$m, the magnetic film disk material formed by spattering or plating has a high level of surface smoothness.

When a floating head possessing an extremely smooth slider surface lands on the disk of the foregoing description and remains in contact for a long time it adheres to the disk due to van der Waals forces.

In magnetic disk devices of the ordinary grade, the disk drive motors for rotating the disks (hereinafter referred to as "DDM") are given the smallest possible torques partly for the reason of production cost. These magnetic disk devices, therefore, have the disadvantage that their disks cease rotating.

OBJECT AND SUMMARY OF THE INVENTION

An object of this invention is to provide a magnetic disk device which warrants safe rotation of the disk even when the slider surface of the magnetic head and the disk develop the phenomenon of fast mutual adhesion.

The magnetic disk device of the present invention comprises disk rotating means for rotating a disk possessing a smooth recording surface, a magnetic head possessing a smooth slider surface adapted to contact the aforementioned recording surface when the disk is kept at rest, a carriage arm for retaining the magnetic head, carriage arm displacing means for changing the position of the carriage arm, a stopper enabled to change position into a closed state and an opened state and, in the closed state, control the movement of the aforementioned carriage arm, means for opening and closing the stopper, and control means for controlling the aforementioned disk rotating means, carriage arm displacing means, and stopper opening and closing means so as to enable the aforementioned carriage arm to swing with the stopper kept in the closed state.

In the magnetic device of the present invention, the carriage arm is able to swing with the stopper kept in the closed state when the disk is set rotating. Even when the disk and the magnetic head happen to come into mutual adhesion, therefore, they can be separated from each other and the disk can be easily set rotating.

DETAILED DESCRIPTION OF PREFERRED EMBODIMENTS

Now, preferred embodiments of the present invention will be described in detail below with reference to the accompanying drawings.

Figure 1:
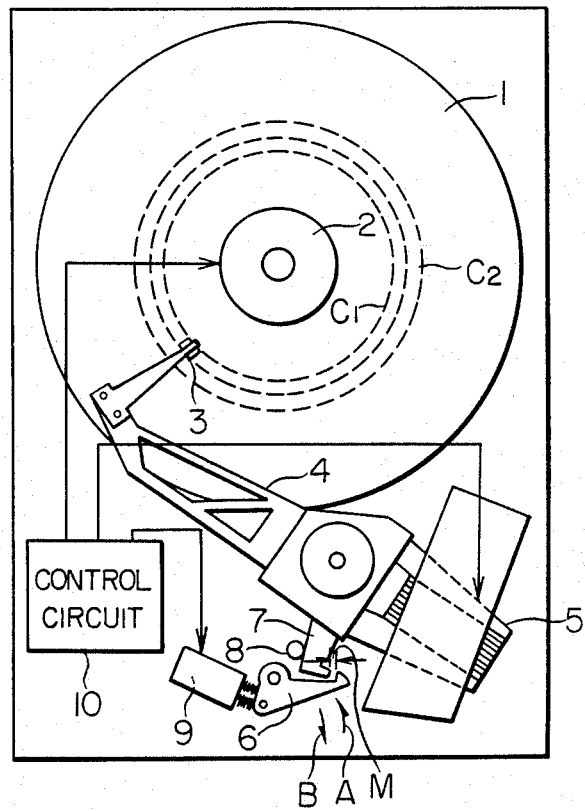
FIG. 1 is a plan view illustrating the configuration of a typical device embodying the present invention, FIG. 2, (A)-(E), is a flow diagram illustrating the operation of the typical device, FIG. 3, (a)-(e), is a timing chart illustrating the operation of the typical device of the first embodiment with reference to relevant electric currents, FIG. 4, (a)-(e), is a timing chart illustrating the operation of the typical device of the second embodiment of the present invention with reference to relevant electric currents, FIG. 5, (a)-(e), is a timing chart illustrating the operation of the typical device of the third embodiment of the present invention with reference to the relevant electric currents.

FIG. 1 is a plan view illustrating the configuration of one typical device embodying the present invention. The present embodiment represents application of the invention to a swing arm type magnetic disk device.

In the diagram, 1 stands for a disk having an extremely smooth layer of magnetic material formed on a surface by the process of spattering or plating, 2 for a DDM serving to impart rotation to the disk 1, 3 for a magnetic head adapted to effect writing and reading of data while being slightly floated up by the current of air generated during the rotation of the disk 1, 4 for a carriage arm adapted to support the magnetic head 3 and further move this magnetic head 3 substantially in the direction of the radius of the disk 1, and 5 for a voice coil motor (hereinafter referred to as "VCM") serving to change the position of the carriage arm 4.

Further, 6 stands for a hook-shaped stopper adapted to assume a closed state (the state resulting from the movement in the direction of the arrow A) and fix the carriage arm 4 so that the magnetic head 3 will be positioned in the contact-start-stop zone $C_1$ on the inner circumferential side of the disk 1, 7 for a projecting part formed on the carriage arm 4 side as opposed to the stopper 6, and 8 for a pin raised from the rear side of the projecting part 7 and adapted to control the change of position of the carriage arm 4 in the direction of the inner circumference of the disk 1.

Then, 9 stands for a solenoid for permitting change of position of the stopper 6 between the closed state (the state resulting from the movement in the direction of the arrow A) and the opened state (the state resulting from the movement in the direction of the arrow B) and 10 for a control circuit serving to control the DDM 2, VCM 5, and solenoid 9.

In the present embodiment of this invention, a gap M of a size of about 0.5 mm is formed between the leading end of the stopper 6 and the leading end of the projecting part 7 so that the carriage arm 4 may be allowed to move slightly between the stopper 6 and the pin 8 even when the stopper 6 is kept in the closed state.

Owing to this arrangement, the magnetic head 3 is allowed to change position on the disk 1 to the zone $C_2$ slightly on the outer circumferential side from the zone $C_1$ even when the stopper 6 is in the closed state thereof.

Figure 2:
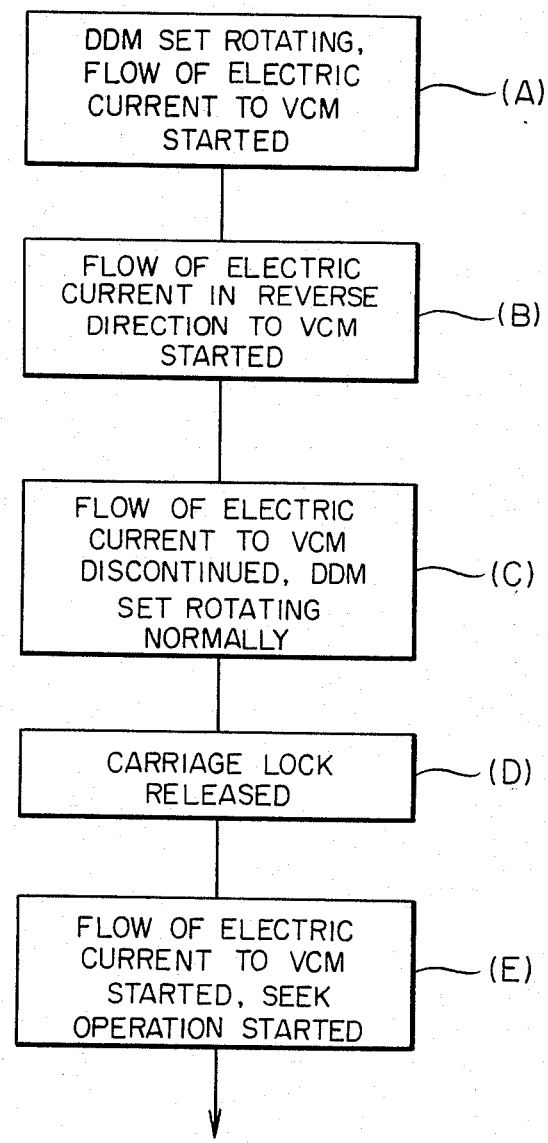

FIG. 2 is a flow diagram illustrating the operation of the device of the present embodiment. Now, the operation of this device will be described below with reference to FIG. 2.

After the device is connected to the main power source, the control circuit 10 permits flow of DC electric current to the VCM 5 for a duration of about 100 ms simultaneously with the start of the DDM 2 (Step A).

Subsequently, it permits flow of DC electric current in the reverse direction to the VCM 5 for a duration of about 100 ms (Step B).

The control circuit 10, with these steps of operation as one cycle, causes the carriage arm 4 to swing several times and then discontinues the flow of DC electric current to the VCM 5.

Since these steps enable the magnetic head 3 and the disk 1 to be separated from each other even after they have been in the state of mutual adhesion, the DDM 2 is able to start. Thus, the DDM 2 is set rotating normally (Step C).

Then, the control circuit 10 permits the flow of electric current to the solenoid 9 and causes the stopper 6 to assume the open state (Step D). Subsequently, it permits the flow of a prescribed magnitude of electric current to the VCM 5 in its normal routine and causes it to start a seek operation (Step E).

Figure 3:
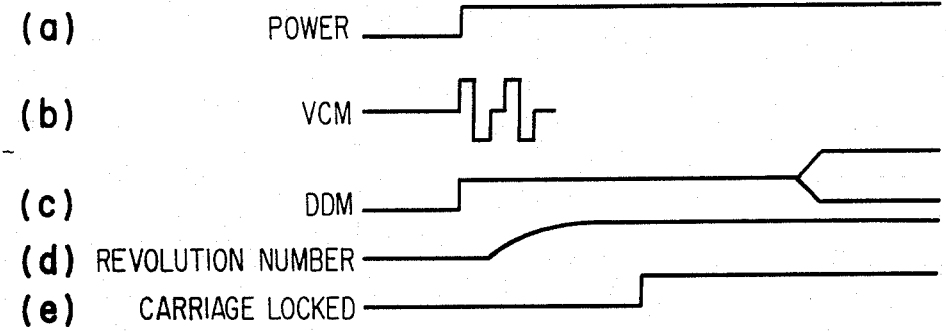

FIG. 3 is a timing chart illustrating all the aforementioned steps of operation with reference to the relevant electric currents.

In the chart, (a) stands for the main power source, (b) for the electric current caused to flow to the VCM 5, (c) for the electric current caused to flow to the DDM 2, (d) for the revolution number of the disk 1, and (4) for the electric current caused to flow to the solenoid 9.

As noted from this chart, the device of the present invention causes the carriage arm 4 to swing by alternately feeding DC electric currents flowing in opposite direction to VCM 5 simultaneously with the start of the DDM 2 after the connection of the device to the main power source. At this step, therefore, the disk 1 and the magnetic head 3 can be separated from each other even when they have been in the state of mutual adhesion and the disk 1 is able to rotate without fail.

Figure 4:
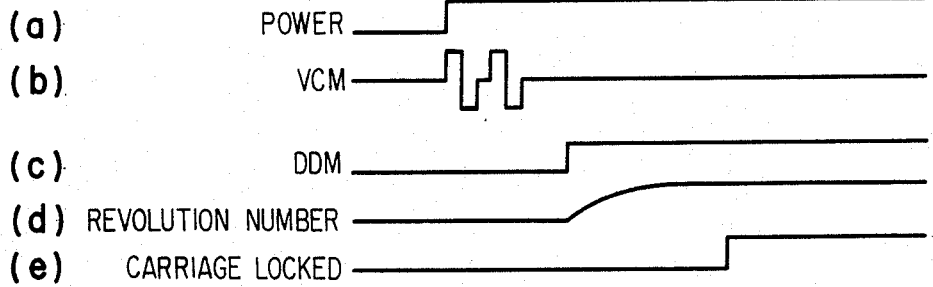

In the present embodiment, the electric current is permitted to flow to the VCM 5 at the same time that the electric current flows to the DDM 2. In an alternative embodiment, as illustrated in FIG. 4, the electric current is first permitted to flow only to the VCM 5 and, after the magnetic head 3 and the disk 1 in the state of mutual adhesion have been separated from each other, the electric current is permitted to flow to the DDM 2.

Figure 5:
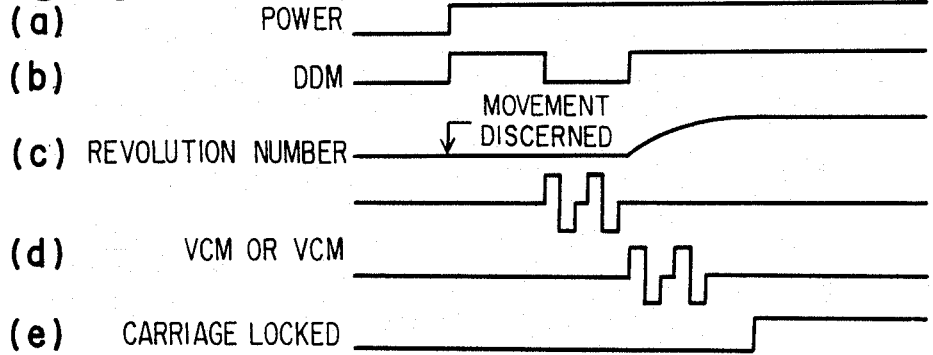

Further in the device of this embodiment, the carriage arm 4 is caused to swing whether or not the disk 1 and the magnetic head 3 have developed the phenomenon of fast mutual adhesion. In a third embodiment, as illustrated in FIG. 5, the device is configured so that the presence or absence of the phenomenon of fast mutual adhesion between the disk 1 and the magnetic head 3 is discriminated (as by detection of a rotation error of the DDM 2, for example) and the carriage arm 4 is caused to swing only when fast mutual adhesion exists between the disk 1 and the magnetic head 3.

The device may be configured in a further embodiment so that the number of swings the carriage arm 4 is caused to produce is varied by the number of retries.

Generally, when the number of disks 1 falls in the range of 6 to 8, the largest coefficient of static friction per surface at which rotation is permitted is about $0.9\mu$.

In the conventional magnetic disk device, therefore, the DDM 2 fails to rotate when the degree of mutual adhesion between the disk 1 and the magnetic head 3 exceeds this magnitude of static friction.

The torque of the VCM 5 generally is large enough to cause change of the position of the carriage arm so long as the aforementioned largest coefficient of static friction per surface does not exceed $2\mu$.

This invention, therefore, is capable of amply coping with even the otherwise helpless situation involving unduly strong mutual adhesion between the disk 1 and the magnetic head 3. Thus, the disk 1 is always allowed to start safe rotation.

The device of the embodiment described above is configured so that the VCM 5 is utilized for changing the position of the carriage arm 4. This invention is not limited to this particular arrangement.

For example, the present invention can be equally applied to the magnetic disk device of the class which relies on a stepping motor or a DC motor to drive the carriage arm 4.

Further, in the device of the above embodiments, the carriage arm 4 is designed in the swing arm pattern so as to effect change of the position by rotation. Alternatively, this invention can be equally applied to the so-called linear type magentic disk device in which the carriage arm 4 will effect the change of position linearly.

The device of the foregoing embodiment is further configured so that the movement of the magnetic head 3 will be controlled by the hook-shaped stopper 6 and the projecting part 7 of the carriage arm 4. This invention is not required to be limited to this particular arrangement.

Figure 6:
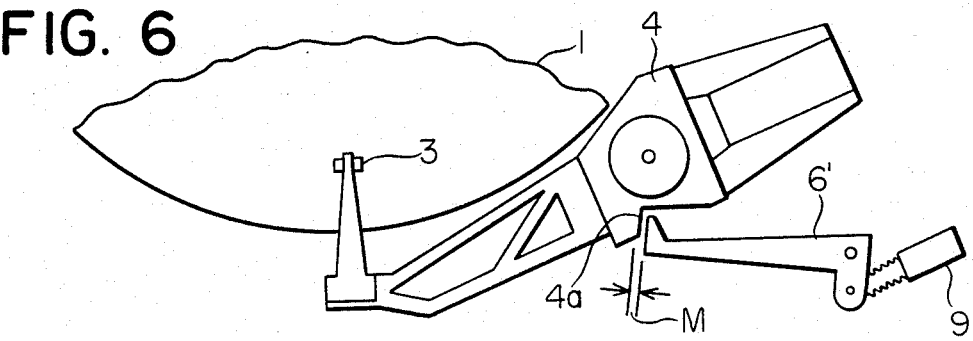
FIG. 6 is a plan view illustrating the configuration of an essential part of a further typical device embodying the present invention.

For example, as illustrated in FIG. 6, a gap M for play of the magnetic head 3 may be interposed between a bar-shaped stopper 6' and a depressed part 4a of the carriage arm 4 so that the movement of the magnetic head 3 will be controlled by the stopper 6' and the depressed part 4a.

As described above, the magnetic disk device of the present invention, in starting the disk, causes the carriage arm to swing with the stopper kept in the closed state. Even when the disk and the magnetic head happen to develop the phenomenon of fast mutual adhesion, therefore, the device readily separates them and permits the disk to be rotated without fail.

What is claimed is:

1. A magnetic disk device using as a data recording medium a metallic film disk having a smooth layer of magnetic material forming a recording surface, comprising;
    a disk rotating means for rotating said disk;
    a magnetic head possessing a smooth slider surface adapted to contact said recording surface when said disk is kept at rest;
    a carriage arm for supporting said magnetic head;
    carriage arm displacing means for changing the position of said carriage arm;
    a stopper enabled to change position into a closed state and an opened state and, in the closed state, to restrain the movement of said carriage arm with a predetermined play;

stopper opening and closing means for changing the position of said stopper in said opened state and said closed state; and control means for controlling said disk rotating means, said carriage arm displacing means, and said stopper opening and closing means, said control means applying a movement control signal to said carriage arm displacing means for swinging said magnetic head within the play permitted by said stopper in the closed state to separate said magnetic head from said recording surface.

2. The magnetic disk device according to claim 1, wherein said stopper is a cam adapted to come into contact with a projection formed on said carriage arm with play.

3. The magnetic disk device according to claim 1, wherein said stopper is an arm adapted to come into contact with a depressed part formed in said carriage arm with play.

4. The magnetic disk device according to claim 1, wherein said control means is adapted to actuate said disk rotating means at the same time that said carriage arm is caused to swing by said carriage arm displacing means.

5. The magnetic disk device according to claim 1, wherein said control means is adapted to actuate said disk rotating means immediately after said carriage arm is caused to swing by said carriage arm displacing means.

6. The magnetic disk device according to claim 1, wherein said control means is adapted to detect the status of actuation of said disk rotating means and, only upon detection of the absence of said actuation, enable said carriage arm displacing means to swing said carriage arm.

7. The magnetic disk device according to claim 1, wherein said carriage arm displacing means is a voice coil motor.

8. The magnetic disk device according to claim 1, wherein said carriage arm displacing means is a DC motor.

9. The magnetic disk device according to claim 1, wherein said carriage arm possesses a swing arm type mechanism capable of changing the position thereof rotationally.

* * * * *